United States Patent
Denuit et al.

(10) Patent No.: US 9,009,112 B2
(45) Date of Patent: Apr. 14, 2015

(54) REORGANIZATION OF DATA UNDER CONTINUOUS WORKLOAD

(75) Inventors: Bruno H. M. Denuit, Redmond, WA (US); Tomas Talius, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 12/723,696

(22) Filed: Mar. 15, 2010

(65) Prior Publication Data

US 2011/0225122 A1    Sep. 15, 2011

(51) Int. Cl.
*G06F 17/30*    (2006.01)

(52) U.S. Cl.
CPC ................. *G06F 17/30584* (2013.01)

(58) Field of Classification Search
USPC .......................................................... 707/634
See application file for complete search history.

(56) References Cited

U.S. PATENT DOCUMENTS

| | | | |
|---|---|---|---|
| 5,710,915 A | 1/1998 | McElhiney | |
| 6,223,182 B1 | 4/2001 | Agarwal et al. | |
| 6,609,131 B1 | 8/2003 | Zait et al. | |
| 6,920,460 B1 | 7/2005 | Srinivasan et al. | |
| 6,931,390 B1 | 8/2005 | Zait et al. | |
| 7,035,851 B1 * | 4/2006 | Sinclair et al. ........................ 1/1 |
| 7,266,561 B2 | 9/2007 | Focazio et al. | |
| 7,269,595 B1 | 9/2007 | Loboz et al. | |
| 7,319,997 B1 | 1/2008 | Morris et al. | |
| 7,958,088 B2 * | 6/2011 | Yerneni et al. ................ 707/610 |
| 8,051,032 B2 * | 11/2011 | Cooper et al. ................ 707/602 |
| 8,055,615 B2 * | 11/2011 | Roberts et al. ................ 707/610 |
| 2002/0169745 A1 | 11/2002 | Hotti et al. | |
| 2003/0158868 A1 | 8/2003 | Zoltan | |
| 2007/0239661 A1 * | 10/2007 | Cattell et al. ...................... 707/2 |
| 2007/0288526 A1 | 12/2007 | Mankad et al. | |
| 2009/0037365 A1 | 2/2009 | Sinclair et al. | |

OTHER PUBLICATIONS

Hvasshovd et al., "The ClustRa Telecom Database: High Availability, High Throughput, and Real-Time Response", 1995, pp. 469-477.*
Chong, et al., "Multi-Tenant Data Architecture", Retrieved at <<http://www.wrappedapps.com/files/729.pdf>> Jun. 2006.
"International Search Report", Mailed Date: Oct. 21, 2011, Application No. PCT/US2011/028155, Filed Date: Mar. 11, 2011, pp. 7.

* cited by examiner

*Primary Examiner* — Hung Q Pham
(74) *Attorney, Agent, or Firm* — Ben Tabor; Kate Drakos; Micky Minhas (57) ABSTRACT

Architecture that provides the capability to automatically (e.g., dynamically) reorganize (repartition) an existing partition by dividing (splitting) or recombining (merging) logical databases. This reorganization can be performed to logical databases belonging to the same customer, and based on the partitioning of the tables in these databases. This can include not only splitting secondary replicas of a partition or merging secondary replicas of the partition, but also splitting off secondary replicas of the partition to create a new partition and merging two partitions into one partition. Moreover, these operations can occur while the logical databases are accepting workload (online).

20 Claims, 8 Drawing Sheets

REORGANIZATION OF DATA UNDER CONTINUOUS WORKLOAD

BACKGROUND

Offering database functionality as a service (referred to "software as a service") requires implementing multi-tenancy within a physical database. Multi-tenancy data can be hosted to provide varying degrees of access via different applications that can range from isolated to shared, for example. Thus, in an isolated environment, tenants are isolated from each other in logical databases. As the logical databases grow in size, or the workload patterns change, this optimal number can change. It therefore becomes desirable to optimize the number and size of logical databases per physical server.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the capability to automatically (e.g., dynamically) reorganize (repartition) existing logical databases by dividing (splitting) or recombining (merging) such databases. This reorganization can be performed to logical databases belonging to the same customer, and based on the partitioning of the tables in these databases. This can include not only splitting a partition or merging a partition, but also splitting off secondary replicas of the partition to create a new partition. Moreover, these operations can occur while the logical databases are accepting workload (online).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture provides split and merge functionality to replication in a distributed database. This functionality dynamically divides or recombines logical database units of the database (e.g., belonging to the same customer). This can occur even while the logical database units are accepting workload (also referred to as online data).

The architecture also applies to database systems that employ partitions of tables in these databases. A partition can be considered a transactionally consistent unit of schema and data, a unit of scale-out in a distributed database system. The partition can include a primary replica and zero or more secondary replicas (copies of a partition). The primary replica receives data modifications and then sends (e.g., concurrently) the modifications to the secondary replicas. Replicas are typically placed on multiple machines to protect the data due to hardware and/or software failures.

The partition comprises tables in the database system. The tables include a column with the same name and type across all of the tables, and by which the tables are partitioned. The column is called the partitioning key. Each partition contains a horizontal slice of the tables, defined by a range of values of the partitioning key. All writes are performed against the primary replica; reads can optionally be performed against secondary replicas as well.

Each partition has one primary replica and multiple secondary replicas. Writes are performed against the primary replica. Reads can optionally be performed against secondary replicas as well. All the changes performed against the indexes are captured as the changes are being performed by the relational engine of the database system. Both schema and data are replicated. This guarantees that no schema mismatches are possible across replicas as all the changes follow the same replication protocol and always happen on primary replica.

The changes are then asynchronously sent to multiple secondary replicas. This does not block the primary replica from making further progress until it is time for the transaction to commit. In one implementation, a quorum system can be employed among the replicas. In such a scenario, a quorum (half+1) of acknowledgements is obtained from the secondary replicas. Waiting only for a quorum of acknowledgements smoothes over the presence of transient slow-downs on some of the replicas and commit even if some of the replicas are failing yet not received a failure notification. The maximum delta between the slowest secondary replica and the primary replica can also be controlled, which guarantees manageable catch-up time during the recovery from failures.

After a quorum of secondary replicas sends the acknowledgments, the locks held by the transaction are released, and the transaction commit is acknowledged to the database system client. If a quorum of replicas fails to acknowledge, the client connection is terminated and the outcome of the transaction is undefined until the failover completes.

The failover system guarantees that the transaction will be preserved as long as a quorum of replicas is available. Note that in contrast to distributed transaction systems (also known as two-phase commit systems), this is a single phase commit. Note that a major difference from traditional asynchronous replication is the ability to tolerate failovers at any point in time without data loss, where as in asynchronous database replication systems the amount of data loss is undefined as the primary and secondary replicas can have arbitrarily diverged from each other.

For the purposes of recovery from failure, CSN (commit sequence number) concept is provided where the CSN is a tuple of (epoch, number) used to uniquely identify a committed transaction in the system. The changes are committed on primary and secondary replicas using the same CSN order. CSNs are logged in the database system transaction log and recovered during database system crash recovery. CSNs allow replicas to be compared during failover. Among possible candidates for new primary replica, the replica with the highest CSN is picked. This guarantees all the transactions that have been acknowledged to the database system client have been preserved as long as a quorum of replicas is available. The epoch component is increased each time a failover occurs, and is used to disambiguate transactions that were in-flight during failures (otherwise duplicate transaction commit numbers can be assigned).

After a failure, a replica can attempt to catch-up from the current primary replica. Mechanisms to assist in this process include an in-memory catch-up queue, a persisted catch-up queue using the database system transaction log as the durable storage, and the replica copy.

The catch-up and copy algorithms are online, that is, the primary replica can accept both read and write requests while a secondary replica is being caught up or copied. The catch-up algorithms identify the first transaction which is not known to the secondary replica (based on the CSN provided by the secondary replica during catch-up) and replay changes from there.

In the limited cases where the catch-up algorithm is less effective (e.g., too many changes since a failure point, replica divergence by committing an transaction not committed by other replicas), a copy algorithm can be used to catch-up the secondary, and has the following properties: the copy algorithm is online, which is supported by having the copy run in two data streams: the copy scan stream and the online change stream; the two streams are synchronized using locks at the primary replica; the copy operation is safe as it does not destroy the transactional consistency of the secondary partition until the copy completes successfully; and, the copy operation does not have a catch-up phase and is guaranteed to complete as soon as the copy scan finishes.

Both during catch-up and copy, the secondary replica operates in an "idempotent mode" which is defined as: insert row (or create schema entity) if it is not there; update row (or modify schema entity) if it is there; and delete row (or drop schema entity) if it is there. The idempotent mode is utilized because during catch-up, it is possible to have overlapping transactions that have already committed on the secondary. Idempotent mode allows the ability to ignore the already applied changes at the secondary replica. Additionally, during copy, it is possible for the copy stream to send rows or schema entities that were just created as part online stream. It is also possible for online stream to attempt to update or delete rows that have not been copied yet.

The disclosed architecture captures all the data modifications performed against the indexes as the modifications are performed by the engine (e.g., relational) of the database system at the primary replica. These modifications are then asynchronously sent to the secondary replicas.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
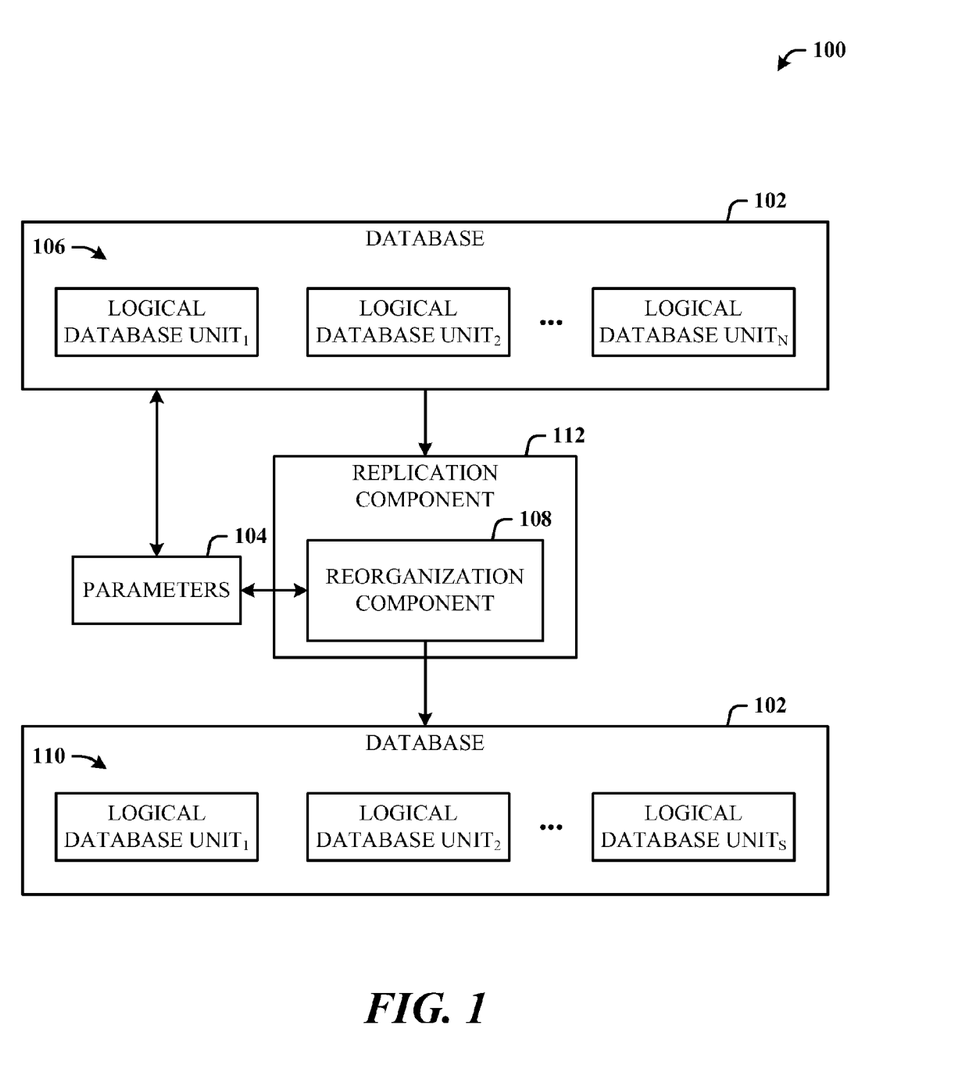
FIG. 1 illustrates a computer-implemented database management system in accordance with the disclosed architecture.

FIG. 1 illustrates a computer-implemented database management system 100 in accordance with the disclosed architecture. Generally, system 100 includes a reorganization component 108 as part of a replication component 112 that employs both split functionality and merge functionality. The split functionality allows the addition to a partition of one or more secondary replicas which contain a smaller slice of the partition key range than the key range associated with the parent partition. These replicas are referred to as "filtered" and only apply the modifications for table rows that fall within the corresponding smaller partition key range. The merge functionality performs the opposite operation such that multiple (e.g., two) primary replicas send modifications to a single secondary replica that spans both partition key ranges.

When a filtered secondary replica is added to the partition, there are ways in which the replication mechanism can ensure the secondary replica receives all the modifications it needs. These ways include catch-up and copy.

Catch-up sends all the modifications that occurred on the partition from the primary replica to the secondary replica(s). In this case, the secondary replica(s) filter out the modifications that are correspondingly relevant. Copy does not look at the modifications, but rather reads (scans) from the table on the primary replica and sends the current data to the secondary replica. In this case, the table scan on the primary replica can be limited to only the rows pertinent to the filtered secondary replica.

In support thereof, the system 100 can include a distributed database (e.g., relational) 102 defined by parameters 104 and having a composition 106 of logical database units (denoted Logical Database Units$_{1-N}$) that provide online data. The system 100 can also include the reorganization component 108 that monitors the parameters 104 relative to performance limits and performs dynamic adjustment to the database composition 106 to create a new composition 110 (denoted Logical Database Units$_{1-S}$) of logical database units in response to changes that impact database performance. In other words, based on the performance parameters, the database is dynamically adjusted to increase or decrease the number of logical database units in the database composition.

The logical database units operate online (data accessible at all times) to provide continuous access to the data during adjustment by the reorganization component 108. The reorganization component 108 can split a logical database unit into two logical database units in response to an adverse impact on the database performance. The two logical database units filter received modifications to only allow relevant modifications for replication. The logical database unit is a replica of a partition of replicas which receives modifications to replica data via a replication catch-up operation. The logical database unit is a replica of a partition of replicas which receives modifications to replica data via a replication copy operation that only scans source replica tables relevant to the replica.

The reorganization component 108 can also merge multiple logical database units into a single logical database unit to reduce overhead costs associated with managing the multiple logical database units independently. The multiple logical database units can be primary replicas of different partitions from which modifications are merged into the single logical database unit, which is a secondary replica. Eventually, this secondary replica becomes a primary replica for the new merged partition.

Figure 2:
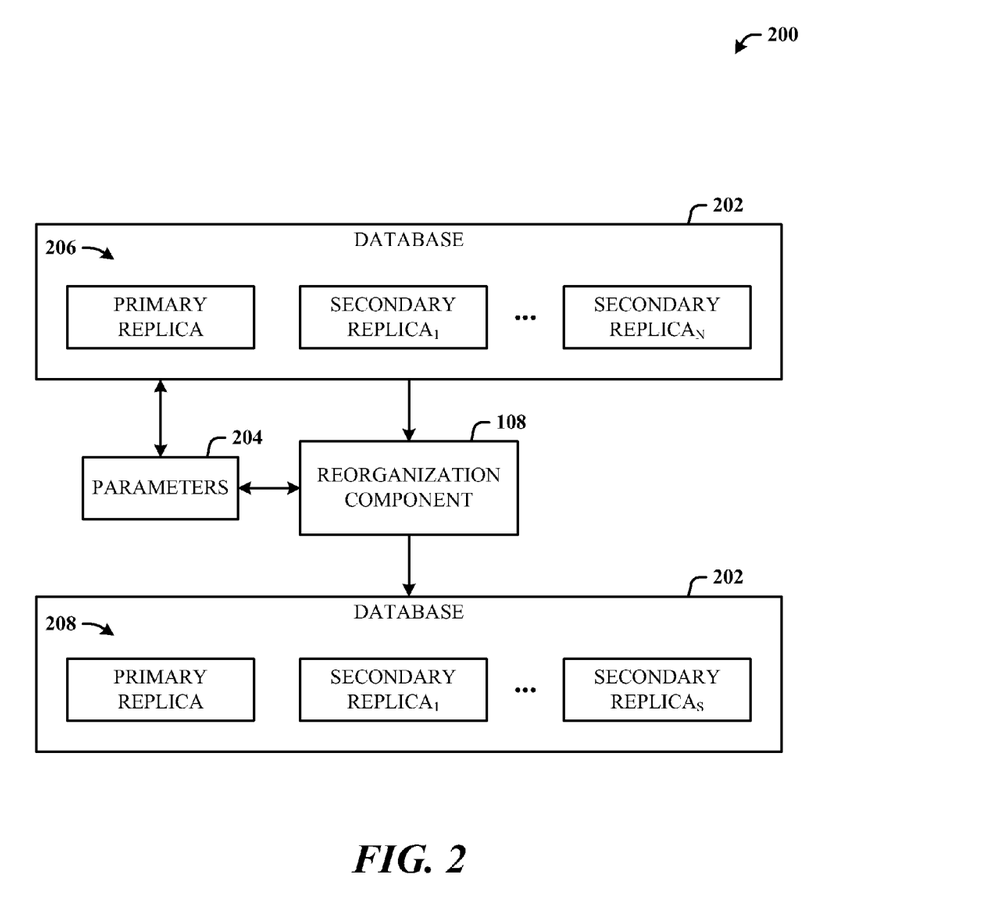
FIG. 2 illustrates an alternative embodiment of a database management system more specific to partitions and partition replicas.

FIG. 2 illustrates an alternative embodiment of a database management system 200 more specific to partitions and partition replicas. The system 200 includes a distributed database 202 defined by parameters 204 and having a composition 206 of replicas (denoted Primary Replica and Secondary Replicas$_{1-N}$) that provide data. The composition 206 of replicas operates online to provide continuous access to the data. The reorganization component 108 monitors the parameters 204 relative to performance limits, for example, and performs dynamic adjustments to the database composition 206 of replicas to create a new composition 208 (denoted Primary Replica and Secondary Replicas$_{1-S}$) of replicas in response to changes that impact database performance.

The reorganization component 108 can split a replica into smaller replicas in response to an adverse impact on the database performance. The smaller replicas each filter data modifications received from a primary replica to only allow relevant modifications. A replica (child) derived from the split can receive the data modifications via a replication catch-up operation or a replication copy operation. The reorganization component 108 can also merge multiple replicas into a single replica to reduce overhead costs otherwise associated with managing the multiple logical database units independently, where the multiple replicas are primary replicas of different partitions from which modifications are merged into the single replica.

The distributed database 202 can be a distributed relational database that comprises a primary replica and one or more secondary replicas distributed on multiple server machines. The reorganization component 108 can dynamically adjust the composition 206 by increasing or decreasing the secondary replicas in number according to the impact on database performance.

Figure 3:
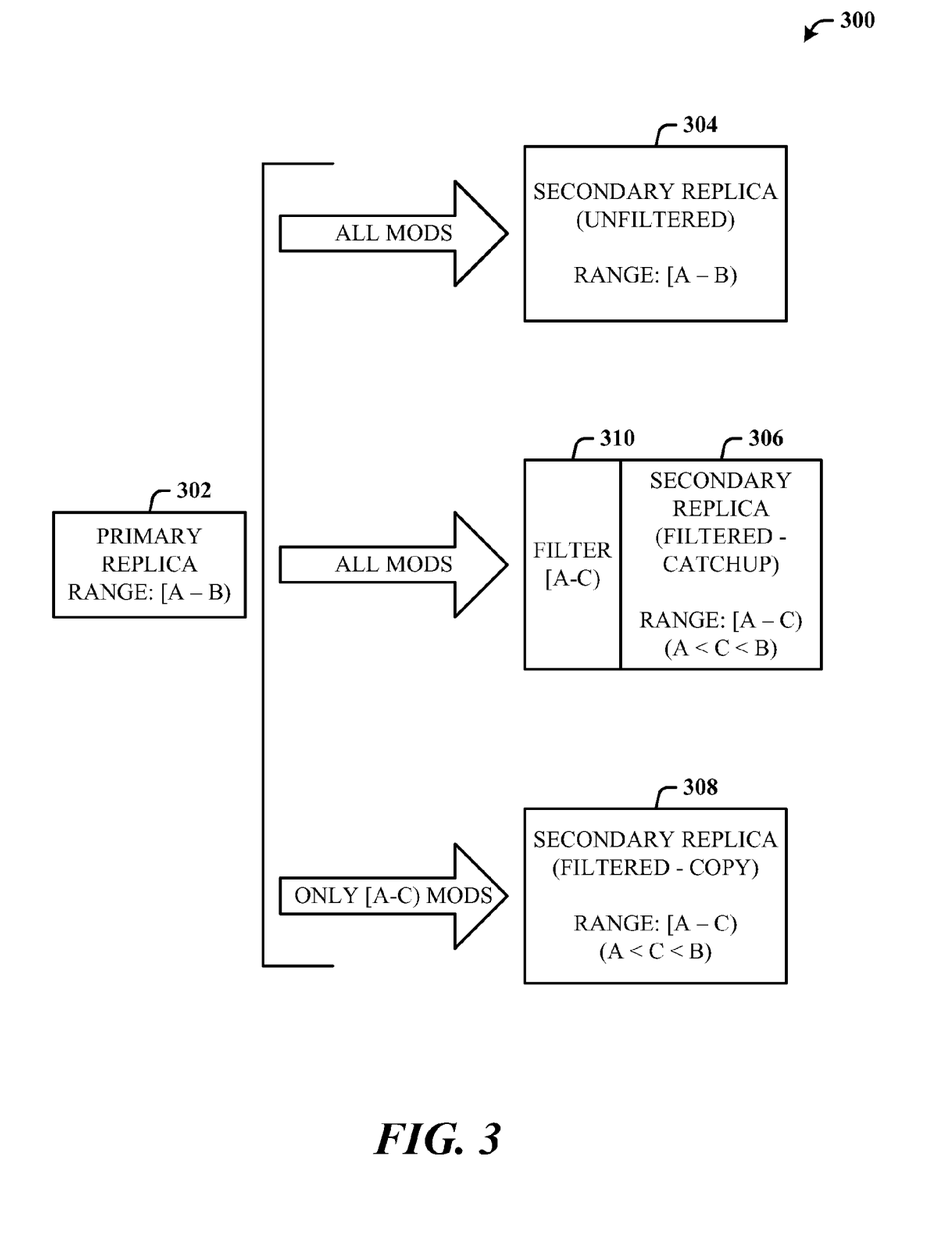
FIG. 3 illustrates a diagram of different ways in which modifications made in a logical database unit can be replicated to other logical database units.

FIG. 3 illustrates a diagram 300 of different ways in which modifications made in a logical database unit can be replicated to other logical database units. Here, the logical database units are replicas: a primary replica 302, a first secondary replica 304, a second secondary replica 306, and a second secondary replica 308. The primary replica 302 has a partition key range of [A-B), where the left bracket "[" represents a closed end to the set of partition key ranges A-B, and the right parenthesis ")" represents an open end to the set of partition key ranges A-B.

In a first example, all modifications (All Mods) made to the primary replica 302 are sent to the first secondary replica 304. The first secondary replica 304 is unfiltered, so all modifications sent are replicated to the first secondary replica 304.

The second secondary replica 306 uses a filter 310 that filters all modifications from the primary replica 302 associated with partition keys in the range of [A-C). As shown, the key range [A-C) is a sub-range to the larger range [A-B), as denoted by (A<C<B). Thus, for modifications sent from the primary replica 302 to the second secondary replica 306, only those modifications associated with partition table entries identified within the partition key range [A-B), and more specifically to the sub-range [A-C), are replicated to the second secondary replica 306. Note that replication to the second secondary replica 506 is accomplished via the catch-up method. As previously indicated, the catch-up method sends all the modification that occurred on the partition from the primary replica to the secondary replica(s), and the secondary replica(s) filter(s) out the modifications that are correspondingly relevant. Note that in all cases, the filter can be a set of expressions that perform the filtering function.

The third secondary replica 308 uses filtering by copy, which occurs only at the primary replica tables. Recall that copy does not look at the modifications, but rather reads (scans) the tables on the primary replica and sends the current data modifications to the secondary replica. The table scan on the primary replica 302 can be limited to only the rows pertinent to the filtered secondary replica. As depicted, again, the key range [A-C) is a sub-range to the larger range [A-B), as denoted by (A<C<B). Thus, for modifications sent from the primary replica 302 to the third secondary replica 308, only those modifications associated with partition table entries in the primary replica 302 identified within the partition key range [A-B), and more specifically to the sub-range [A-C), are replicated to the third secondary replica 308.

Figure 4:
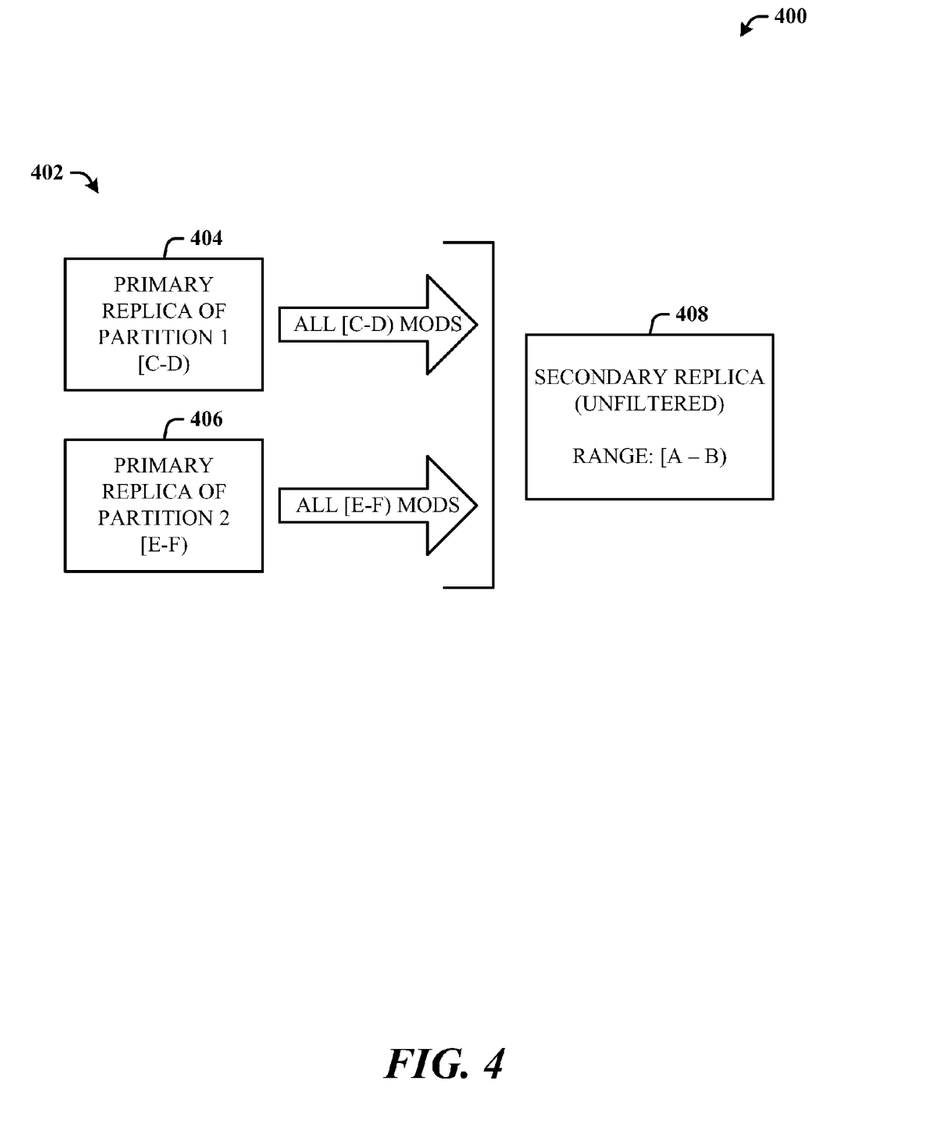
FIG. 4 illustrates a diagram for a merge operation in accordance with the disclosed architecture.

FIG. 4 illustrates a diagram 400 for a merge operation in accordance with the disclosed architecture. Here, modifications of primary replicas 402 are merged into a single secondary replica. For example, the primary replicas 402 can include a first primary replica 404 of a first partition having modifications in a partition key range [C-D) and a second primary replica 406 of a second partition having modifications in the partition key range [E-F). The merge function is applied to merge the modifications from the primary replicas 402 into a single secondary replica 408 for the partition key range [A-B), where C, D, E, and F are within the range of [A-B).

Following is example syntax that can be employed in an external interface for initiating a split and a merge. The split command syntax can be:

---
Splitpartition <appName>, <tablegroupName>, <low>, <high>, <split-point> [, <split-point>...]
---

One implementation may allow only a single split point, yet another implementation can allowed for more split points.

The merge command syntax can be:

---
Mergepartition <appName>, <tablegroupName>, <new-low>, <new-high>
---

This creates a merged partition with the <new-low>-<new-high> range and includes all existing partitions within that range. <new-low> either matches the <low> of an existing partition or is in an unallocated range. <new-high> either matches the <high> of an existing partition or is in an unallocated range.

Figure 5:
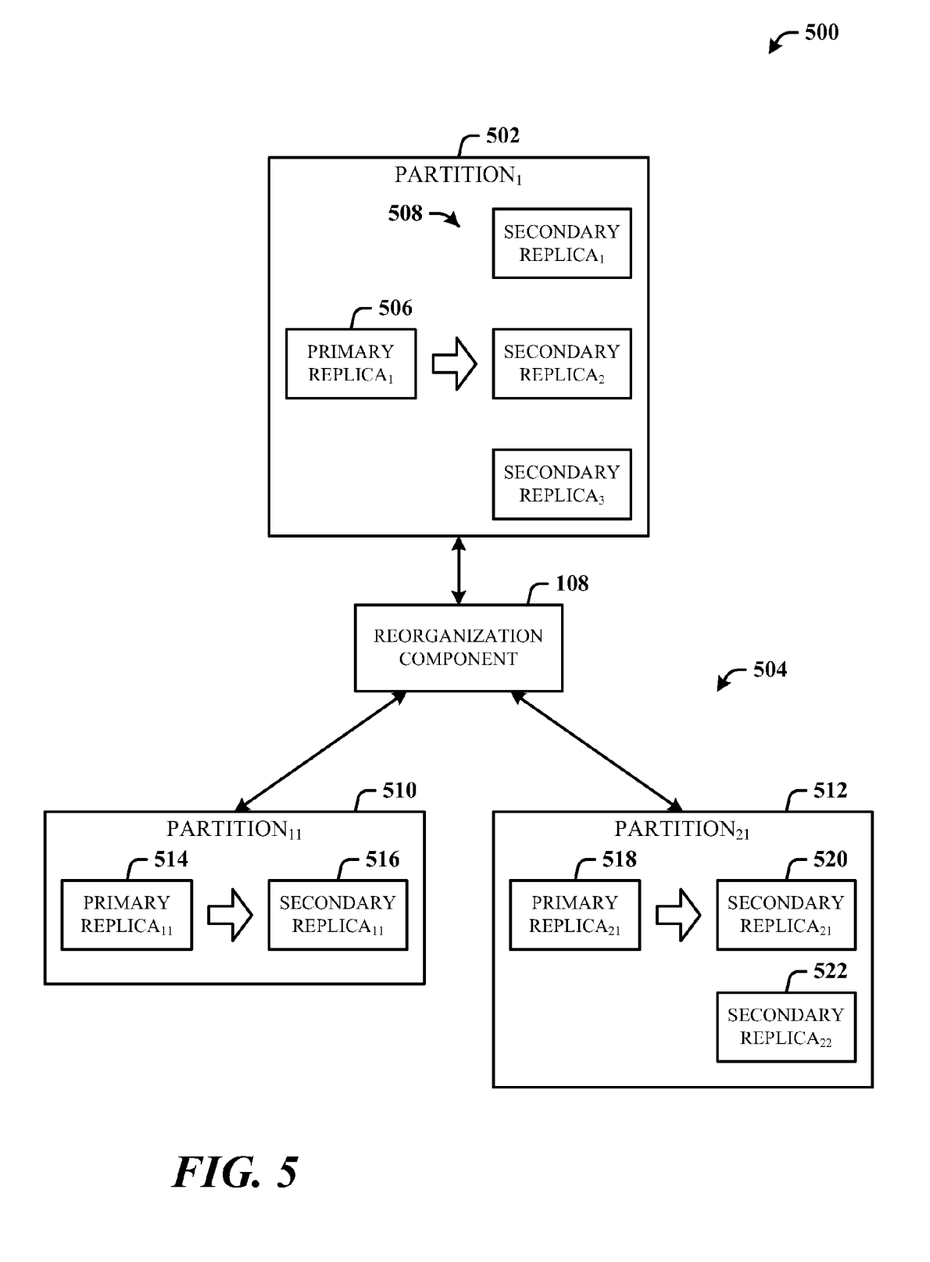
FIG. 5 illustrates is a system that splits a first partition into sub-partitions based on adverse impact to the database performance.

FIG. 5 illustrates is a system 500 that splits a first partition 502 (a logical database unit) into sub-partitions 504 (logical database units) based on adverse impact to the database performance. This functionality can occur at the partition level to reduce the size, for example, of an unwieldy partition. Consider that the first partition 502 includes a primary partition 506 and three secondary partitions 508. The first partition 502 has grown to a size that now adversely impacts database and/or machine performance. It can also be the case that the parameters of the database and/or machine that are monitored now breach one or more policies put in place to manage performance of the database and/or machine systems.

In any case, the reorganization component 108 monitors and dynamically adjusts the composition of the replicas (506 and 508) for the first partition 502 into two sub-partitions: a second partition 510 and a third partition 512. The second partition 510 is created to now include a second primary replica 514 and a secondary replica 516 (and optionally other secondaries). The third partition 512 is created to now include a third primary replica 518 and secondary replicas (520 and 522).

The partitions (510 and 512) can be relocated to different machines as desired, or both remain on the same machine, since resources can now be allocated independently to the partitions (520 and 522). Filtering can be applied as described herein with respect to splitting replicas.

The merge operation can be applied as well by the reorganization component to merge partitions such that the merger would not adversely impact database/system performance, or perhaps even improve performance, as managed by the policies against the parameters being monitored. Merge is performed similar to replica merge described herein.

Following is additional description of split and merge functionality. Partition split and merge can be employed to manage partition size. When a partition grows excessively large for a single server machine or based on some other policy-based limit, for example, the partition can be split into one or more other sub-partitions so that new data can still be added to the partition. Conversely, when partition sizes become small due to data deletions, for example, the overhead cost of managing and querying the partitions independently becomes large. Thus, it will be useful to combine the partitions so as to reduce the total overhead, for example, or for other beneficial purposes.

In the context of the logical database units as partitions, the partition split and merge can be modeled as a combination of replica creation and partition reconfiguration. First, the target replica or replicas are built and then reconfigurations are undertaken that deactivate the source partition(s) and activate the target partition(s). In the case of split, the target partitions are the split (or child) partitions and the source partition is the current partition. For merge, the target partition is the combined merged partition while the source partitions are the current individual partitions.

Partition split starts when the reorganization component splits a partition into two or more child partitions. The child partitions are created and marked as dependent on the parent partition. During regular processing, the replicas are created for the child partitions from the parent partition. Once each child partition has sufficient replicas, the partitions are reconfigured to deactivate the parent partition and activate the child partitions. This process leaves the parent partition deactivated and primary-less. The child partitions become independent partitions at this point. The parent partition is dropped.

Partition merge begins when a list of partitions to merge is provided. The merged partition is created and the current partitions are marked as dependent on the merged partition. During regular processing, the replicas are created for the merged partition from the current individual partitions. Once the merged partition has sufficient replicas, the partitions are reconfigured to deactivate the original partitions and activate the merged partition. This process leaves the original partitions inactive and primary-less. The merged partition becomes active with a primary. The original partitions are dropped.

The split and merge designs are similar and can be generalized into a single combined design. Split/merge begins with the creation of partitions that are dependent on each other. During regular processing, replicas are created for the newly created partition(s) based on the existing partition(s). Once the newly created partitions(s) have sufficient replicas, the partitions are reconfigured to deactivate the original partition (s) and activate the newly created partition(s). This process leaves the original partitions inactive and primary-less. The newly created partition(s) are independent partitions at this point. The original partition(s) are eventually dropped.

This implementation of partition merge and split includes the notions of dependent partitions, cross partition replication, and super-configurations. Dependent partitions are partitions that have some dependency on each other and cannot be processed independently. This is a departure from the current implementations where each partition is processed independently. Dependency links between partitions are indicated using owning partition links. These links comprise the partition id of the partition on which the partition (or replica) depends. When processing messages or state for a partition, the owning partition is loaded even if a message is destined for a dependent partition. This allows the owning partition to remain aware of any changes to the dependent partitions. Information needed for decisions from the appropriate partition can be retrieved.

With respect to cross-partition replication, the need to build and catch-up child or merged replicas is no longer limited to replicas of the same partition. For split, the replication layer handles secondary replicas that contain only a subset of the primary replica. As previously indicated, these are referred to as filtered secondary replicas. For merge, the replication layer is able to handle receiving replication streams from multiple primaries at a single secondary.

Super-configurations are configurations that contain separate configurations for multiple partitions. A configuration defines the makeup of the partition at least in terms of replicas. For quorum calculations (the quorum computed based on the primary and a set of secondary replicas that acknowledge receiving modifications sent from the primary) all of the configurations quorum independently before the super-configuration is considered to have reached quorum.

The child replicas (new replicas) during split are built by copying from an existing replica rather than physically split an existing replica; similarly, with merge the merged replicas are not created by stitching two existing replicas even if the replicas exist on the same node (machine).

As previously described, dependencies between partitions can be indicated using a concept of an owning partition id. This id identifies the partition that is currently responsible for handling the given partition.

Dependent partitions can be handled as a single group. In order to facilitate this, a partition object can be a tree of interdependent partitions with the root partition managing all the other partitions. As the root partition is responsible for all the partitions, when a request is made to fetch a partition, the entire tree starting at the root is returned even if the request is for one of the dependent partitions.

The processing logic can handle the processing of all of the interdependent partitions, to include processing messages, adding/dropping replicas, as well as reconfigurations. Specific values that are needed for processing are based on values for the root partition, dependent partition(s), or a combination.

Replicas for the new (child) partition(s) are created by building them from primary replica(s) for the original partition(s) using the same logic as for building replicas of the same partition. In the case of split, this means adding the filtered secondary replicas into the primary replica's replication relationship. In the case of merge, this can involve adding the new replicas to the replication relationships of each original partition's primary replica.

The split reconfiguration is split into two phases. This is done because the split reconfiguration results in multiple primary replicas, and splits the responsibilities of reconfiguration leader and primary from each other. The first phase deactivates the parent partition, and also ensures that a quorum of each child partition's initial configuration is caught-up to the parent partition. The child partitions are caught up at this point because the second phase of reconfigurations no longer has access to the parent partition. This implies that the initial configuration for each child partition is determined before the deactivation reconfiguration starts.

The initial configuration consists of replicas from the set of replicas built earlier in split. This initial configuration is communicated to each of the child partitions during an activate phase of the of deactivation reconfiguration and is thus persisted. The primary replica for this reconfiguration is the current primary for the parent partition (or any other parent partition replica if the current primary is down). Once the reconfiguration is complete this primary stops acting as a primary (this reconfiguration leaves the parent partition without a primary). At the completion of the deactivation reconfiguration, then child partitions become independent partitions.

The second phase activates the child partitions. Here, independent reconfigurations are started for each child partition and establish an active primary for them. These reconfigurations can be performed in parallel.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
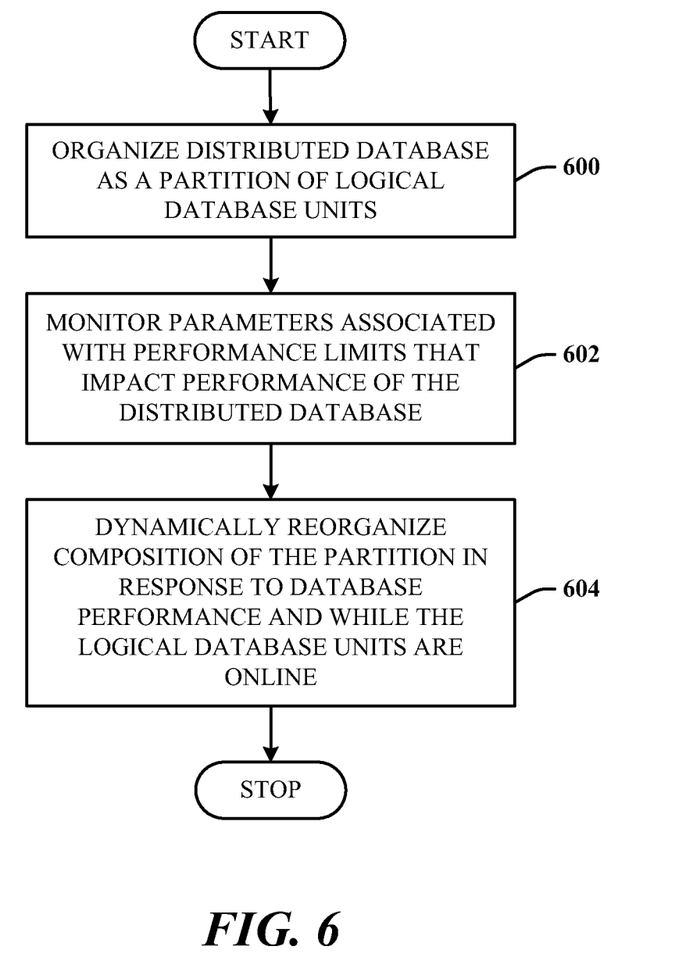
FIG. 6 illustrates a computer-implemented database management method in accordance with the disclosed architecture.

FIG. 6 illustrates a computer-implemented database management method in accordance with the disclosed architecture. At 600, a distributed database is organized as a partition of logical database units (e.g., replicas—primary and secondary). At 602, parameters associated with performance limits (software, server machine hardware, small or large size of the partition, network bandwidth, etc.) that impact performance of the distributed database are monitored. At 604, the composition (e.g., number of logical database units) of the partition is dynamically reorganized in response to database performance and while the logical database units are online.

Figure 7:
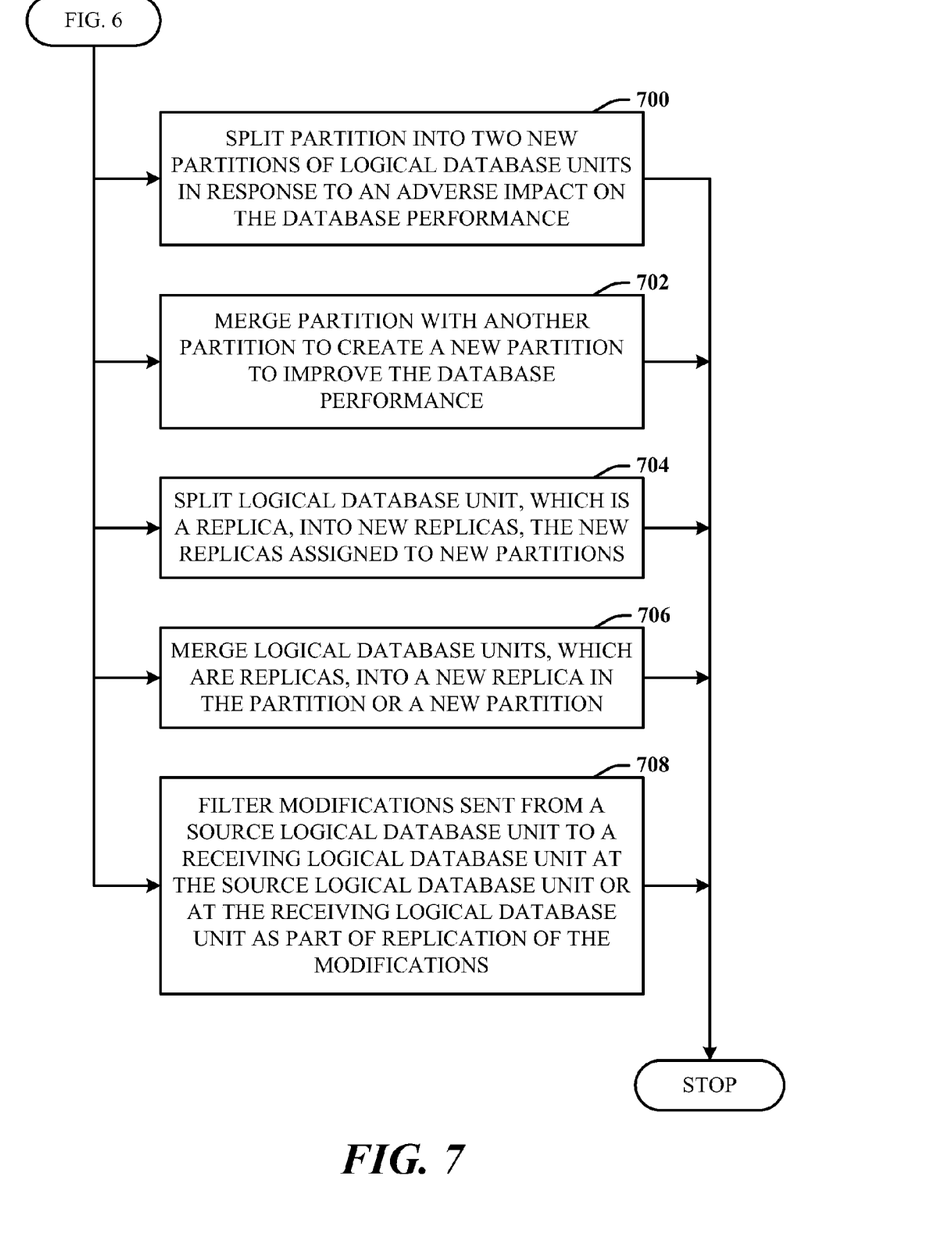
FIG. 7 illustrates additional aspects of the method of FIG. 6.

FIG. 7 illustrates additional aspects of the method of FIG. 6. At 700, the partition is split into two new partitions of logical database units in response to an adverse impact on the database performance. At 702, the partition is merged with another partition to create a new partition to improve the database performance. At 704, a logical database unit, which is a replica, is split into new replicas, the new replicas assigned to new partitions. At 706, logical database units, which are replicas, are merged into a new replica in the partition or a new partition. At 708, modifications sent from a source logical database unit to a receiving logical database unit are filtered at the source logical database unit or at the receiving logical database unit as part of replication of the modifications.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
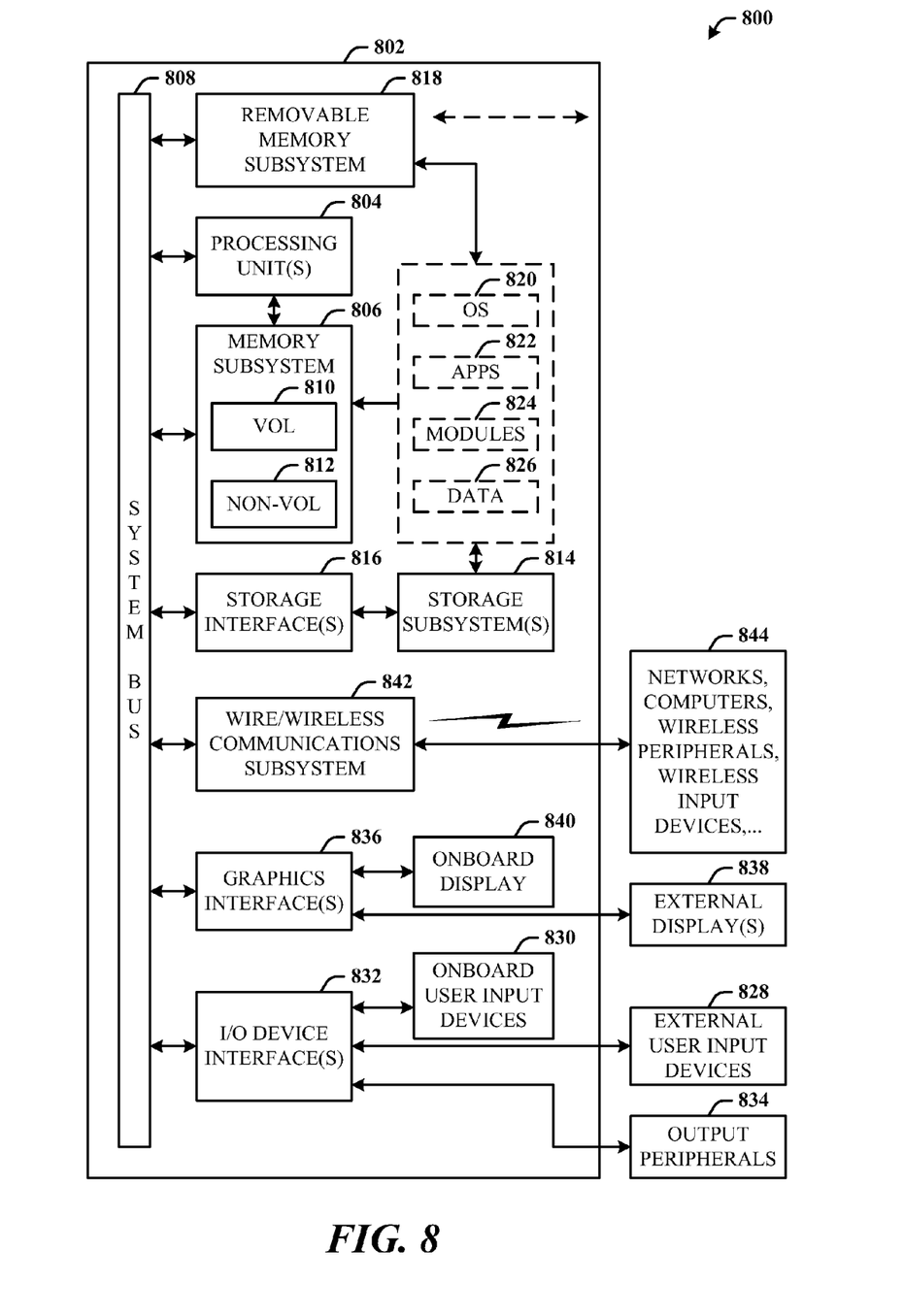
FIG. 8 illustrates a block diagram of a computing system operable to reorganize partitioned data under a continuous workload in accordance with the disclosed architecture.

Referring now to FIG. 8, there is illustrated a block diagram of a computing system 800 operable to reorganize partitioned data under a continuous workload in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example.

The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, the entities and flow of the diagram 300 of FIG. 3, the entities and flow of the diagram 400 of FIG. 4, the entities and components of the system 500 of FIG. 5, and the methods represented by the flow charts of FIGS. 6 and 7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. The storage subsystem (s) 814 and memory subsystems (806 and 818) serve as computer readable media for volatile and non-volatile storage of data, data structures, computer-executable instructions, and so forth. The instructions can exist on non-transitory media. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A database management system comprising:
one or more computer readable storage media storing executable instructions that when executed by a processor provide:
a reorganization component configured to monitor performance parameters of a database relative to performance limits and perform dynamic adjustment of a composition of logical database units that provide online data of the database to increase or decrease the logical database units of the composition in response to changes that impact database performance, the reorganization component configured to merge multiple logical database units into a single logical database unit, the multiple logical database units being primary replicas of different partitions, the primary replicas receiving data modifications, the single logical database unit being a secondary replica, the secondary replica receiving the data modifications from the primary replicas.

2. The system of claim 1, wherein the logical database units operate online to provide continuous access to the online data during adjustment by the reorganization component.

3. The system of claim 1, wherein the reorganization component splits a logical database unit into two logical database units in response to an adverse impact on the database performance.

4. The system of claim 3, wherein the two logical database units filter received modifications to only allow relevant modifications for replication.

5. The system of claim 3, wherein the logical database unit is a replica or a partition of replicas, the partition or replica receiving modifications to data via a replication catch-up operation.

6. The system of claim 3, wherein the logical database unit is a replica or partition of replicas, the replica or partition receiving modifications to data via a replication copy operation that only scans source tables relevant to the replica or the partition.

7. The system of claim 1, wherein the reorganization component merges the multiple logical database units into the single logical database unit in response to determining merging the multiple database units would reduce overhead costs associated with managing the multiple logical database units independently below a threshold value.

8. The system of claim 1, wherein the primary replicas remain primary replicas after being merged into the single logical database unit.

9. A computer-implemented database management system comprising:
a reorganization component, at least partially implemented by a processor, configured to monitor parameters of a database that is operable with a physical media relative to performance limits of the database relative to replication and perform dynamic adjustments to a composition of replicas of the database configured to provide data to increase or decrease the replicas of the composition in response to changes that impact database performance, the reorganization component configured to:
commit a dynamic adjustment when fewer than all of the plurality of replicas affected by the dynamic adjustment acknowledge the dynamic adjustment, and
merge multiple replicas into a single replica, the multiple replicas being primary replicas of different partitions, the primary replicas receiving data modifications, the single replica being a secondary replica, the secondary replica receiving the data modifications from the primary replicas.

10. The system of claim 9, wherein the reorganization component splits a replica into smaller replicas in response to an adverse impact on the database performance, the smaller replicas each filter data modifications received from a primary replica to only allow relevant modifications.

11. The system of claim 10, wherein the replica receives the data modifications via a replication catch-up operation or a replication copy operation.

12. The system of claim 9, wherein the reorganization component merges the multiple replicas into the single replica in response to determining merging the multiple replicas into the single replica would reduce overhead costs otherwise associated with managing the multiple logical database units independently below a threshold value.

13. The system of claim 9, wherein the database is a distributed relational database that comprises a primary replica and secondary replicas distributed on multiple server machines, the reorganization component dynamically adjusting the composition by increasing or decreasing the secondary replicas in number according to the impact on database performance.

14. The system of claim 9, wherein the composition of replicas is a first partition that is dynamically adjusted into a first sub-partition and a second sub-partition to improve the database performance.

15. A computer-implemented database management method that executes on a processor and memory, comprising:
organizing a database as a partition of logical database units;
monitoring parameters associated with performance limits that impact performance of the database;
dynamically reorganizing a composition of the partition in response to database performance and while the logical database units are online, dynamically reorganizing including committing a dynamic reorganization when a replica of a portion of the database has not acknowledged the dynamic reorganization; and
merging multiple replicas into a single replica, the multiple replicas being primary replicas of different partitions, the primary replicas receiving data modifications, the single replica being a secondary replica, the secondary replica receiving the data modifications from the primary replicas.

16. The method of claim 15, further comprising splitting the partition into two new partitions of logical database units in response to an adverse impact on the database performance.

17. The method of claim 15, further comprising merging the partition with another partition to create a new partition as a result of determining merging the partition with another partition would improve the database performance below a threshold value.

18. The method of claim 15, further comprising splitting a logical database unit, which is a replica, into new replicas, the new replicas assigned to new partitions.

19. The method of claim 15, further comprising merging logical database units, which are replicas, into a new replica in the partition or a new partition.

20. The method of claim 15, further comprising filtering modifications sent from a source logical database unit to a receiving logical database unit at the source logical database unit or at the receiving logical database unit as part of replication of the modifications.

* * * * *